United States Patent
Kuris et al.

(10) Patent No.: US 7,908,440 B2
(45) Date of Patent: Mar. 15, 2011

(54) SIMULTANEOUS PERSONAL SENSING AND DATA STORAGE

(75) Inventors: Benjamin Kuris, Brookline, MA (US); Donald R. Denning, Jr., Shirley, MA (US); Steven M. Ayer, Marblehead, MA (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 11/836,285

(22) Filed: Aug. 9, 2007

(65) Prior Publication Data

US 2009/0043920 A1 Feb. 12, 2009

(51) Int. Cl.
*G06F 13/26* (2006.01)
(52) U.S. Cl. ......................................................... 711/149
(58) Field of Classification Search .......................... None
See application file for complete search history.

(56) References Cited

U.S. PATENT DOCUMENTS

| 6,591,350 B1* | 7/2003 | Stenfort ........................ 711/158 |
| 7,270,633 B1* | 9/2007 | Goscha et al. ................ 600/300 |
| 2004/0015618 A1* | 1/2004 | Risi et al. ....................... 710/15 |

* cited by examiner

*Primary Examiner* — Duc T Doan
(74) *Attorney, Agent, or Firm* — Caroline M. Fleming

(57) ABSTRACT

A personal sensing device that may be used for storing personal data and sensed data arbitrates and prioritizes competing requests for memory access from sensing, wireless, and wired interfaces. The personal sensing device enables power efficiency with burst-writes to the memory at higher data rates then an incoming sensor data stream without risk of data loss. Sensing operations coordinated by reconfigurable control logic are partitioned from storage operations coordinated by a multi-port memory controller. The interface between the functional partitioning uses message passing, status/control registers and buffering to reduce or eliminate system interdependencies.

20 Claims, 3 Drawing Sheets

SIMULTANEOUS PERSONAL SENSING AND DATA STORAGE

FIELD

This disclosure relates to personal storage devices and in particular to personal storage devices that store data for personal sensing applications such as behavioral or physiological monitoring applications.

BACKGROUND

As the cost of heath care continues to increase coupled with an aging population, sensing devices are being developed to support health monitoring in environments other than a medical environment, for example, in a hospital or doctor's office. These devices can reduce cost of heath care, improve the quality of life for patients and allow monitoring progression of diseases.

A key capability of these devices is the ability to sense that can take the form of direct measurement of biometric parameters, for example, Electrocardiograph (ECG), pulse rate, skin temperature and blood pressure.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A sensing device for sensing biometric parameters needs to be small, have low-power consumption and provide data integrity. In order to provide a small sensing device, the sensing device may temporarily store the sensed data and forward the stored sensed data later over a communications network to a host system for analysis. In a medical application, the sensed data needs to be reliably stored and transferred to the host system. In an embodiment of the present invention, sensed data may be forwarded reliably over the communications network while the sensing device is concurrently generating and storing the sensed data.

A multi-port memory controller arbitrates and prioritizes competing requests to access memory to store and retrieve sensed data in memory. The access requests may be from a sensing interface, and one or more communication network interfaces. The communications network may be wired or wireless. In one embodiment, there may be both wired and wireless communication network interfaces. Sensing operations coordinated by reconfigurable control logic are partitioned from storage operations coordinated by a multi-port memory controller. The configurable control logic acquires data from sensor and performs data markup, analysis, and message passing that result in removing processing and latency from critical operations. An interface between the functional partitioning uses message passing, status registers and buffering to reduce or eliminate system interdependencies.

A majority of operational time is spent in a sensing mode. In sensing mode, the multi-port memory controller enables power efficiency with burst-writes to memory at higher data rates then the incoming sensor data stream without risk of data loss. The multi-port memory controller ensures reliable data exchange with memory or Input/Output devices and may be remotely configured.

In addition to storing sensor data, the multi-port memory controller provides access to both sensed data and personal data stored in the memory. The complexity of the sensing data path is hidden from host devices that may be coupled to the sensing device through one or more communications network interfaces.

Figure 1:
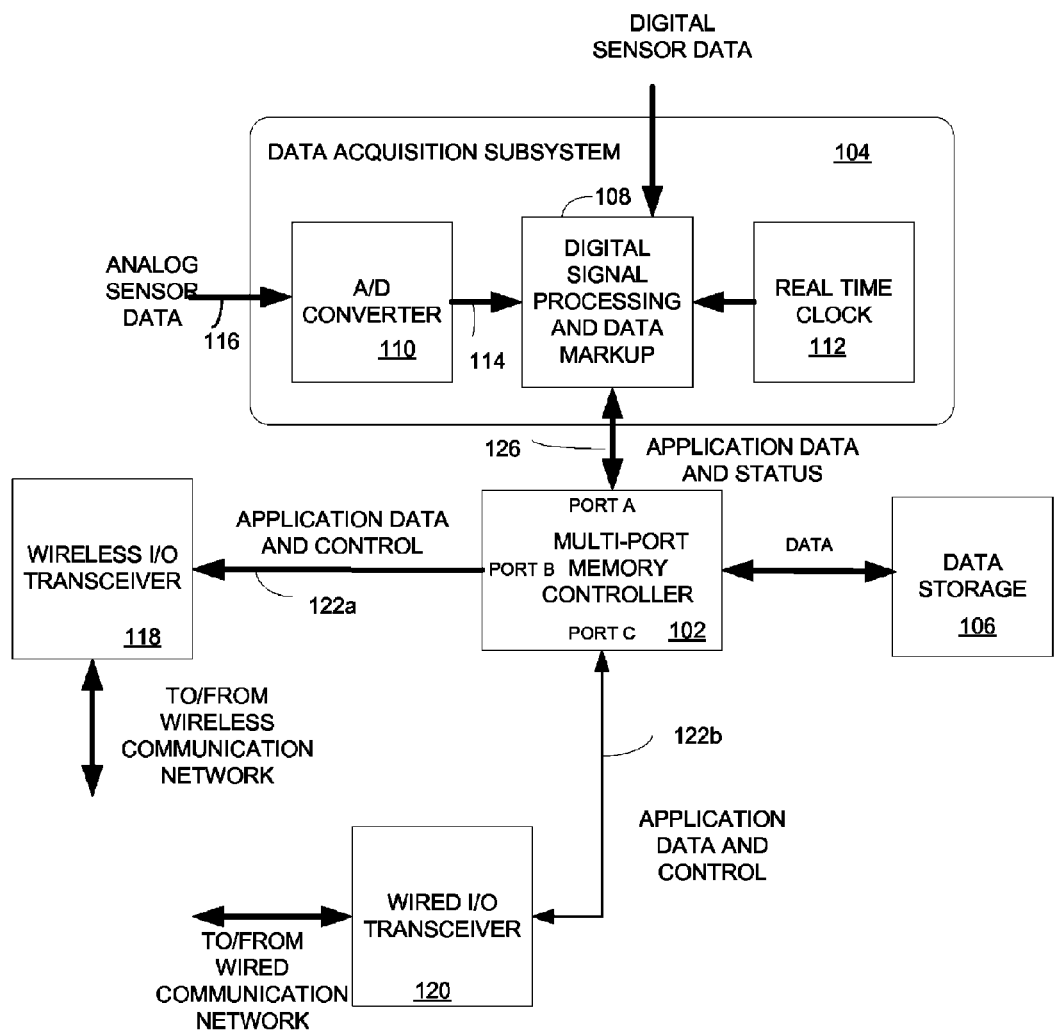
FIG. 1 is an embodiment of a sensing device that includes a multi-port memory controller according to the principles of the present invention.

FIG. 1 is an embodiment of a sensing device 100 that includes a multi-port memory controller 102 according to the principles of the present invention. The sensing device 100 includes a data acquisition subsystem 104 that includes a data signal processing and data markup module 108. The data signal processing and data markup module 108 samples, processes, timestamps, and annotates digital data that may be acquired from an Analog/Digital (A/D) Converter 110 or may be directly received from a sensor (digital sensor data). The ADC converter 110 may be used to convert analog sensor data acquired from one or more Analog-to-Digital converter (ADC) channels. In an embodiment, there may be up to 8 ADC channels. External ADC ports may be utilised for reading data from an accelerometer that may be coupled to the data acquisition subsystem 104.

In addition to the A/D converter 110, the data acquisition subsystem 104 includes a real time clock 112 used by the data signal processing and data markup module 108 for processing the acquired digital data 114.

The data acquisition subsystem 104 may also include a Central Processing Unit (CPU) and memory such as volatile memory (Random Access Memory (RAM)) and/or non-volatile memory (Flash memory) to store data and instructions (code) for execution by the CPU. In an embodiment, the CPU may be a low power 16-Bit Reduced Instruction Set Computer (RISC) CPU that is optimized for high-level programming with a limited number of instructions and addressing modes.

The sensing device 100 also includes transceivers 118, 120 for forwarding the processed data (application data and control 122a, 122b) over a communications network to a host device. The communications network may be wired or wireless. In the embodiment shown, the sensing device 100 includes a wireless Input/Output (I/O) transceiver 118 for receiving and transmitting data over a wireless communications network and a wired I/O transceiver 120 for receiving and transmitting data over a wired communications network. The processed data may be temporarily stored in data storage 106 in the sensing device 100 prior to be transferred through one of the respective transceivers 118, 120 to the wired or wireless communications network.

The transceivers 118, 120 allow applications executing in a remote computer system (host device) accessible via the wired/wireless communication network to access stored sensor data, such as, heart rate for health applications. The transceivers 118, 120 also allow remote configuration of the sensing device 100 for personal sensing applications such as behavioral monitoring for fitness/compliance. A personal sensing application may monitor motion or activity, physiological measures such as heart rate, electrocardiogram (ECG), and blood oxygen saturation, or environmental measurements such as air quality, light, sound, temperature, motion of the device itself or of objects near the sensing device. Environmental measurements may be useful for applications that support elder care, special-needs care, emergency response, athletics, and military actions.

A multi-port memory controller 102 in the sensing device 100 manages data transfer between the transceivers 118, 120, the data acquisition subsystem 104 and data storage 106. There are multiple paths through which data transfer may occur. In the embodiment shown, there are four paths. A first path is between the data acquisition subsystem 104 and data storage 106, for example, to store processed analog sensor data acquired from the A/D converter 110 or digital sensor data. A second path is between the wireless I/O transceiver 118 and data storage 106, for example, when reading data stored in data storage 106 or writing data to data storage 106. The data stored in the data storage 106 may be processed sensor data received from the data acquisition subsystem 104 or data for use by an application that may be unrelated to the data acquisition subsystem 104. A third path is between the wired I/O transceiver 120 and data storage 106. A fourth path is between the data acquisition subsystem 104 and data storage 106.

In addition to transferring processed analog sensor data received by the A/D converter 110 or digital sensor data, any one of the transceiver to memory paths may be used to request status of an application executing in the sensing device 100 or to configure/reconfigure operating parameters in the sensing device 100 or an application that may be executed by the sensing device 100.

The data storage 106 allows the storage of sensor data while the sensing device 100 is not streaming data to a host device over the wired and/or wireless communication networks. The data storage 106 is provided in order to ensure that there is no loss of data while the sensing device 100 is mobile, during communication network outages or while the power source for the sensing device 100 is interrupted, for example, while changing a battery.

The data storage 106 may be flash memory, Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM), Non-Volatile Random Access Memory (NVRAM), Magnetic Random Access Memory (MRAM) or any other type of memory.

In another embodiment, the data storage 106 may be a disk drive, Digital Video Disk (DVD) drive, Compact Disk (CD) drive, Redundant Array of Independent Disks (RAID), tape drive or other storage device. In this embodiment, a disk controller is embedded in the multi-port memory controller 102 to control access to the data storage 106.

The multi-port memory controller 102 includes a plurality of control/status registers to allow either the data acquisition subsystem 104 or one of the transceivers 118, 120 to request a connection to the data storage 106.

A host system which may be a personal computer (PC), mobile (portable) computer (laptop), wireless access point, terminal, a mobile or cellular telephone ("cell phone") or a portable media player or any other type of electronic device may communicate with the sensing device 100 over the supported communication networks through transceivers 118, 120. In one embodiment the sensing device 100 includes a wireless I/O transceiver for the Institute of Electrical and Electronics Engineers (IEEE) 802.15.4 wireless network communications protocol and/or a wireless I/O transceiver for the Bluetooth® wireless network communications protocol.

Modules that support sensing functions such as electrocardiogram (ECG), kinematics, electromyogram (EMG), galvanic skin response (GSR) and electroencephalogram (EEG) may be coupled to the sensing device to provide analog sensing data to the A/D converter 110. For example, a 500 Hz EMG signal captured by a sensor device coupled to the sensing device 100 may be forwarded to a remote processing device over a wireless communication network through data acquisition subsystem 104, multi-port memory controller 102 and wireless I/O transceiver 118.

In an embodiment, the sensing device 100 may synchronize to other applications for example, calendars, and personal health management applications. In an embodiment, the sensing device 100 may be remotely managed. For example, a user may configure the device from any location in the communication network; by placing it into vacation mode, sensing device 100 would cease wireless communication network availability and change to a low power state for long-term data logging, without requiring further interaction from the user. In this case, with the wireless communication network disabled, the sensing device 100 may be reconfigured later through a connection to a wired communication network.

Figure 2:
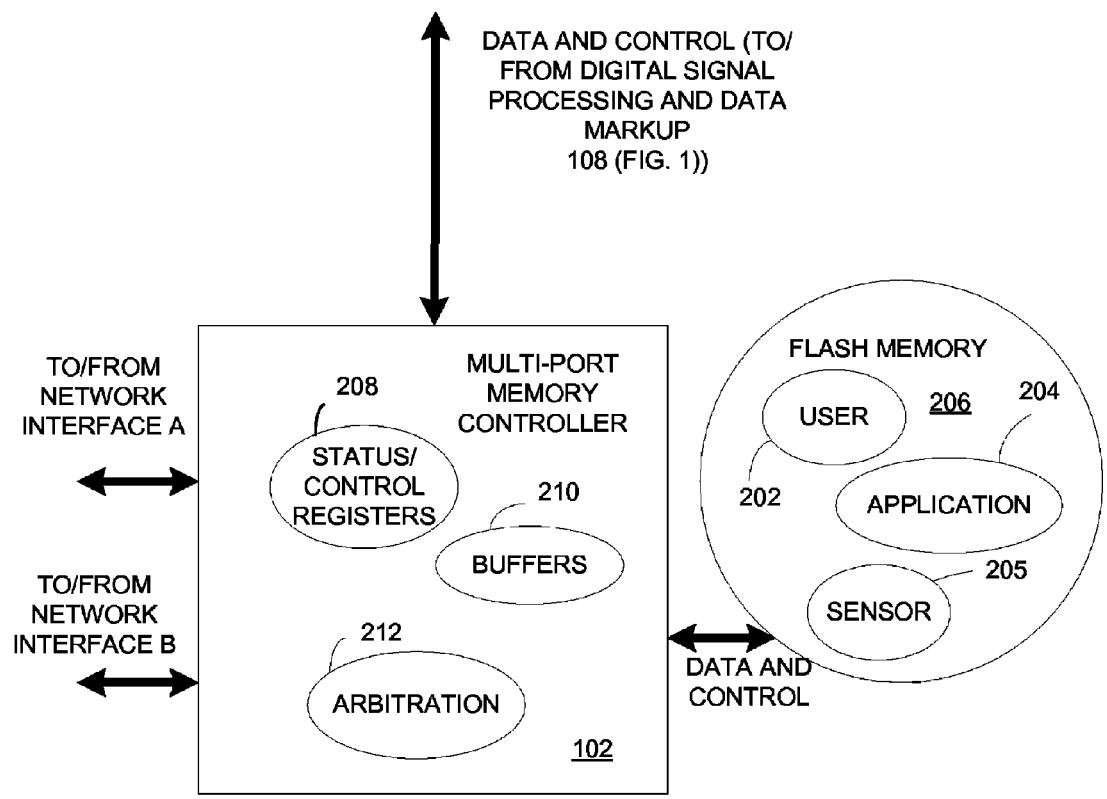
FIG. 2 is a block diagram illustrating the multi-port memory controller and data storage shown in FIG. 1.

FIG. 2 is a block diagram illustrating the multi-port memory controller 102 and data storage 106 shown in FIG. 1.

The digital signal processing and data markup 108 acquires analog sensor data from the A/D converter 110 (FIG. 2) and/or digital sensor data and may perform data markup, data analysis, and message passing on the sensor data.

In the embodiment shown, the data storage is a flash memory 206 that may store application data 204, user data 202 and sensor data 205. In one embodiment the flash memory 206 is MicroSD™ that implements a 1-bit Serial Peripheral Interface (SPI) mode with the SPI bus protocol used to communicate between the multi-port memory controller 102 and the MicroSD™. In other embodiments, the flash memory 206 may be Compact Flash (CF), Memorystick (a removable flash memory card) and SmartMedia (also referred to as a Solid State Floppy Disk Card (SSFDC)) formats.

The user data 202 may be personal data, for example, in a medical application, the user data may be medical records, offering convenience and immediacy at point of treatment. In this embodiment, the sensing device 100 may function as a dual purpose device, for example, as both a sensor datalogger and as a general purpose storage device.

In another embodiment, the user data 202 may be specific user-context data that may be collected when the sensing device 100 is storing/logging data, the user-context data may be behavior that indicates work or study activities, and ties the user of the sensing device to a particular physical location or a communication network node.

An embodiment of the invention provides enhanced system performance for applications, for example, personal behavioral or physiological monitoring applications that require guaranteed dedicated storage and data integrity. Tasks required by the data acquisition subsystem 104 (FIG. 2) are partitioned from Input/Output (I/O) tasks and storage tasks to provide a unique functional partitioning. This functional partitioning provides robust system architecture. Thus, the multi-port memory controller 102 may provide isochronous access to the flash memory 206 sufficient to guarantee no loss of data while managing pending communication requests from network communication interfaces through transceivers 118, 120 (FIG. 1). The partitioning of tasks reduces the possible loss of data or a stalled or hung sensing device, for example due to a series of I/O interrupts that require CPU processing cycles.

Sensing operations controlled by digital signal processing and data markup 108 are partitioned from storage tasks and I/O tasks involving the multi-port memory controller 102. The interface between the multi-port memory controller 102 and digital signal processing and data markup 108 may use message passing controlled by status/control registers 208 and buffering in buffers 210 to reduce or eliminate system interdependencies.

Tasks are divided between the digital signal processing and data markup 108 and the multi-port memory controller 102 in order to remove processing and latency from critical operations. For example, the multi-port memory controller 102 may provide isochronous access to the flash memory 206 sufficient to ensure that there is no loss of data while the multi-port memory controller 102 is managing pending communication requests received from one or more network communication interfaces through the transceivers 118, 120 (FIG. 1).

In an embodiment, the status/control registers 208 includes status and control fields that may include error flags, port status, minimum memory bandwidth for each port, memory sectors (number, start sector, last sector), and mode. For example, the mode field in the status/control registers 208 may store the current mode (state) of the arbitration module 212. The minimum bandwidth may differ dependent on the type of port, for example, the rate at which data may be received from an analog or digital sensor may be much slower than the rate at which data is received from a wired network communications port. For example, data may be received from a sensor at a rate of between 1 kilobits per second (Kbps) and 2.4 Kbps and data may be received from a wired network communications port at 115 Kbps.

The arbitration module 212 in the multi-port memory controller 102 handles requests for access to the flash memory 206 that are received from digital signal processing and data markup 108 and the network communication interfaces. The arbitration module 212 grants access to the flash memory 206 in a similar manner that a Direct Memory Access (DMA) controller grants to a plurality of devices that need to access a shared memory.

The multi-port memory controller 102 includes one or more inputs for receiving requests (polling or interrupts) from a CPU, storage elements that share a common bus, for example, an SPI bus and ports for non-bussed I/O such as a Universal Asynchronous Receiver Transmitter (UART). The multi-port memory controller 102 also includes support (signals, logic) for indicating when it is ready to send or receive data. In addition to prioritizing requests from the multiple ports, each port may have more than one device. For example, there may be multiple devices coupled to network interface A. The status/control registers 308 may be configured to support data transfer to/from multiple devices on one or more network interfaces.

In another embodiment, a multiplexer may be provided to present separate ports such as UART and SPI and these ports may share a common Universal Synchronous/Asynchronous Receiver/Transmitter (USART). In addition to granting access to flash memory 206, the arbitration module 212 also allows priority to be dynamically changed. The status/control registers 208 allow devices that share access to the flash memory 206 to communicate in order to dynamically change priority.

Figure 3:
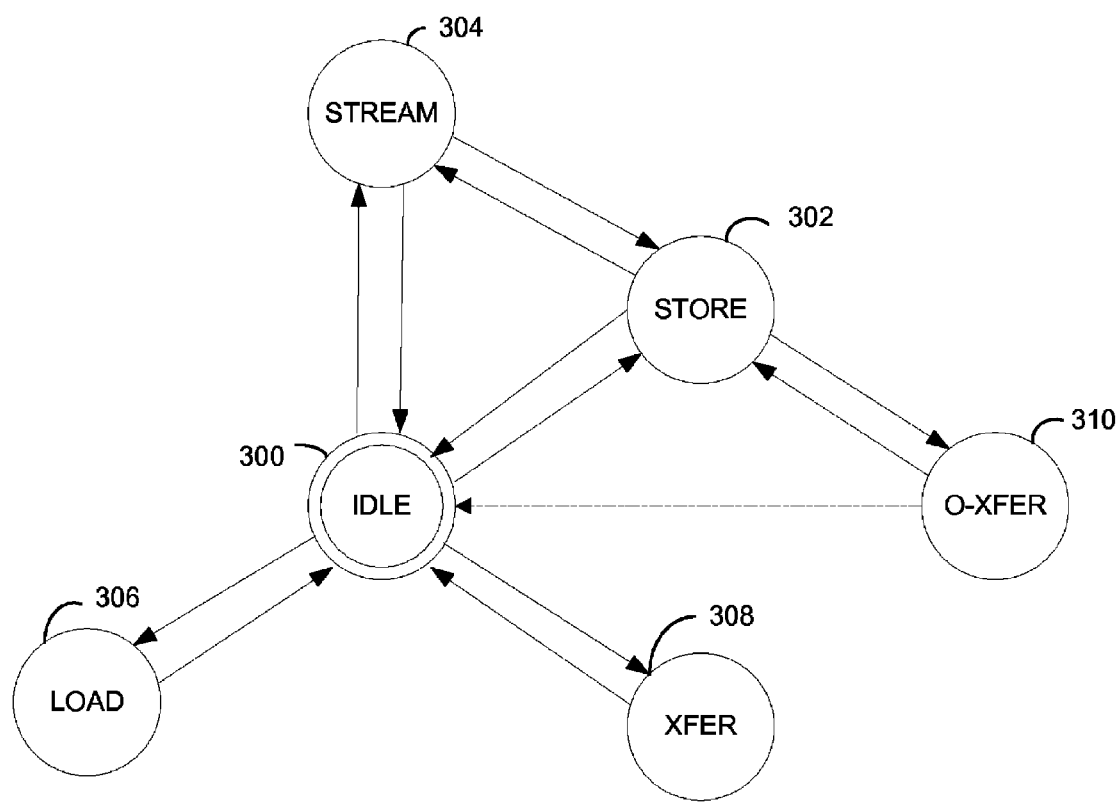
FIG. 3 is a state diagram illustrating arbitration states for the arbitration module in the dynamic multi-port memory controller shown in FIG. 2.

FIG. 3 is a state diagram illustrating arbitration states for the arbitration module 212 in the dynamic multi-port memory controller 102 shown in FIG. 2. FIG. 3 will be discussed in conjunction with FIG. 1 and FIG. 2. The arbitration module 212 may change state upon receiving a command via an I/O port or upon detecting no active I/O connection, for example, if the sensing device 100 is roaming, that is, there is no active connection because the sensing device 100 is in an area that is between wireless networks. A priority is dynamically assigned to each port in the multi-port memory controller dependent on the "state" (mode) of the arbitration module 212.

The multi-port memory controller 102 has the following operational states, IDLE 300, LOAD 306, STORE 302, STREAM 304, XFER (Transfer) 308, and O-XFER (Opportunistic Transfer) 310. Allocation of resources is controlled by the arbitration module 212 that manipulates the resources based upon the current state and input stimuli (commands). The arbitration module 212 allows for the dynamic control of its internal algorithms such that priority for any port may be configured in round robin polling, time-slice, fixed or any nested structure of these combinations based upon the application.

In the IDLE state 300, the multi-port memory controller 102 is not transferring data between any of the available ports.

The multi-port memory controller 102 enters the STORE state 302 upon receiving a "STORE" command issued via any one of the network communications channels (wired or wireless) or the data acquisition subsystem 104. In the STORE state 302 data is acquired from the data acquisition subsystem 104 and routed to the data storage 106. In the STORE state 302 the multi-port memory controller 102 is configured through the status/control registers 208 such that the highest priority is given to data transfers from the data acquisition subsystem 104 to data storage 106 with lower-priority given application control commands from the external network communications ports. The arbitration module 212 may exit the STORE state 302 upon receiving "idle", "stream", or "transfer" commands or on an abort/error condition. Abort and error conditions always revert to the IDLE State 300.

The XFER (Transfer) state 308 is entered upon receiving "data upload" or "data download" command only while in the arbitration module 212 is in the IDLE state 300. In the XFER state 308, the highest priority is assigned to data transfers between the data storage and the external network communications ports. Data transfers are bi-directional depending on the type of command issued. In this state, the data acquisition subsystem 104 is given the lowest priority. The XFER state 308 will exit upon the completion of the data transfer, an "idle" command, or an abort/error condition. The only valid state which may be entered from XFER state 308 is the IDLE state 300.

The O-XFER (Opportunistic Transfer) state 310 is entered upon receiving a "data download" command while in the STORE state 302. In the O-XFER state 310, priority is given to data transfers from the data acquisition subsystem 104 to the data storage 106. During periods of inactivity in transfers from the data acquisition subsystem 104 to the data storage 106 or during a scheduled time slice, the arbitration module 212 reconfigures the multi-port memory controller 102 and transfer data from the data storage 106 to the external network communications port(s). The arbitration module 212 reverts the multi-port memory controller to the STORE state 302 upon the completion of the data transfer, the resumption of activity from the data acquisition subsystem 104, or completion of an allotted time slice. An error/abort condition will revert directly to the IDLE state 300.

The STREAM state 304 is entered upon receiving a "stream data" command. In the STREAM state 304, priority it given to data transfers from the data acquisition subsystem 104 to the external network communications port(s). If the STREAM state 304 is entered from the IDLE state 300, data is not stored in the data storage 106. If the STREAM state 304 is entered from the STORE state 302, data is routed to both the data storage 106 and the external network communications ports. The arbitration module 212 reconfigures the multi-port memory controller 102 for the STORE state 302 upon receiving a "store" command and reverts to the IDLE state 300 upon receiving an "idle" command or an error/abort condition.

The LOAD state 306 can only be entered from the IDLE state 300 upon the receipt of a "load" command. In the LOAD state 306 the multi-port memory controller 102 gives priority to transfers from the data storage 106 to the data acquisition subsystem 104. The LOAD state 306 allows data to be loaded from data storage 106 into the digital signal processing and data markup module 108 in the data acquisition subsystem 104 for data manipulation and processing. The "marked up" or processed data may be subsequently transferred using any of the available modalities. The LOAD state 306 reverts to the IDLE state 300 upon completion of the data transfer or an error/about condition.

Thus, the dynamic allocation of priority to ports in the multi-port memory controller 102 by the arbitration module 212 dependent on the mode (state) of the sensing device allows the sensing device 100 to minimize loss of the sensed data received from the sensor.

The multi-port memory controller 102 enables power efficiency with burst-writes to flash memory 206 at a higher data rate than the rate at which the incoming sensor data stream is being received without risk of data loss. The multi-port memory controller 102 also provides access to both sensor storage areas ("sensor") 205 and personal data storage ("user") 202 in the flash memory 206. In one embodiment, a serial expansion port 224 for a wired transceiver allows a host device 220 to access the sensing device 100. For example, the host device 220 may be a Universal Serial Bus (USB) host that may access the data stored in the flash memory 206 through a wired network interface through the serial expansion port 224 in the same manner as memory is accessed in other personal storage devices. The sensing data path to flash memory 206 is hidden from the host device 220.

The sensing device 100 may be remotely configured via any of the network interfaces (wired or wireless). In one embodiment, the configuration may be performed using well-known methods based on standard communication protocols by a remote, wired or wireless interactive session such as telnet. Status of the device may also be obtained using the same communication protocol. For example, telnet may be used to check device status; start, stop, or change the parameters used to determine data to be logged or exchanged. The ability to remotely configure the device allows device status and configuration parameters to be displayed on a remote terminal.

In an embodiment, instead of storing sensed data in flash memory 206, a "bypass mode" may be provided to bypass the flash memory 206 and allow sensed data from the digital signal processing and data markup 108 to be passed through buffers 210 to one of the network interfaces. For example, the sensor may send data that is stored in buffers 210 directly to the network interface. This type of operation is typically referred to as "streaming data".

In an embodiment, the combination of the reconfigurable control logic unit and multi-port memory controller 102 may be realized in a system-on-a-chip, programmable logic, an Application Specific Integrated Circuit (ASIC), or using a combination of discrete components. ASIC-level integration may result in cost or usability advantages such as smaller form-factor or reduced power consumption resulting in longer run times for devices using a limited lifetime battery power source.

In another embodiment, instead of providing a dedicated multi-port memory controller with status/control registers 208, buffers 210 and arbitration module 212, the function of the multi-port memory controller may be implemented in software. In this embodiment, a scheduler may reserve system resources to allow simultaneous data acquisition and data storage. In this embodiment, memory is controlled by one or more functions stored in CPU Random Access Memory (RAM). As discussed in conjunction with FIG. 2, the microcontroller 200 includes a USART 204, 206, or universal serial port that can operate either in SPI or UART model. In an embodiment, the flash memory is accessible using the SPI model. In this embodiment, the SPI protocol is used by the microcontroller 202 to access the flash memory with the microcontroller 200 configured as the master and the flash memory configured as a slave.

In one embodiment, the sensing device 100 may be a keychain-fob or smaller personal device similar to a Universal Serial Bus flash drive with a rechargeable battery or coin-cell that uses standardized communication protocols such as USB, Transport Control Protocol (TCP)/Internet Protocol (IP), Bluetooth wireless network communications protocol, or Institute of Electrical and Electronics Engineers (IEEE) 802.15.4/Zigbee wireless communications protocol as an underlying transport for the host connection. A user of the sensing device 100 is likely to keep the sensing device 100 with keys, which may result in an increase in the accuracy of behavioral monitoring; for example, in an embodiment the sensing device 100 may function as both a step-counter and storage device.

The multi-port memory controller improves concurrency while ensuring data integrity, and requires fewer computational resources than personal storage devices that do not include a multi-port memory controller.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a data acquisition subsystem to process a real-time data stream received from a sensor; and
   a multi-port memory controller including an arbitration module, the multi-port memory controller to allow concurrent access to a memory by at least two ports, at least one of the ports to store real time data processed by the data acquisition subsystem in the memory, a dynamically configurable priority allocated to each of the ports for prioritizing access to the memory to minimize loss of the real-time data received from the data acquisition subsystem, the priority dependent on a state of the arbitration module, the state configurable remotely from a system accessible through a network communications port.

2. The apparatus of claim 1, wherein at least one of the ports to transfer data over a communications network.

3. The apparatus of claim 2, wherein the communications network is wireless.

4. The apparatus of claim 2, wherein the communications network is wired.

5. The apparatus of claim 1, wherein the memory has a partition for storing user data.

6. The apparatus of claim 5, wherein the user data is personal medical data.

7. The apparatus of claim 1, wherein the real time data is behavioral monitoring data.

8. The apparatus of claim 1, wherein the real time data includes physiological measures.

9. The apparatus of claim 1, wherein the real time data includes environmental measures.

10. The apparatus of claim 1, wherein the state of the arbitration module is configured remotely based on a command received via the network communications port.

11. A method comprising:
processing a real time data stream received from a sensor by a data acquisition subsystem; and
prioritizing requests to store the acquired real time data in a memory to allow concurrent access to the memory by at least two ports in a multi-port memory controller, the multi-port memory controller including an arbitration module, a dynamically configurable priority allocated to each of the ports for prioritizing access to the memory to minimize loss of the acquired real-time data received from the data acquisition subsystem, the priority dependent on a state of the arbitration module, the state configurable remotely from a system accessible through a network communications port.

12. The method of claim 11, wherein at least one of the ports to transfer data over a communications network.

13. The method of claim 12, wherein the communications network is wireless.

14. The method of claim 12, wherein the communications network is wired.

15. The method of claim 11, wherein the memory has a partition for storing user data.

16. The method of claim 15, wherein the user data is personal medical data.

17. The method of claim 11, wherein the real time data is behavioral monitoring data.

18. The method of claim 11, wherein the real time data includes physiological measures.

19. The method of claim 11, wherein the real time data includes environmental measures.

20. The method of claim 11, wherein the state of the arbitration module is configured remotely based on a command received via the network communications port.

* * * * *